US009727899B2

(12) United States Patent
Kesavan et al.

(10) Patent No.: US 9,727,899 B2
(45) Date of Patent: Aug. 8, 2017

(54) MANUFACTURING AND DISTRIBUTION TO AVOID COUNTERFEIT PRODUCTS

(75) Inventors: Sanjay Mecheri Kesavan, Bangalore (IN); Nataraj Nagaratnam, Durham, NC (US); Lohitashwa Thyagaraj, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1941 days.

(21) Appl. No.: 12/791,938

(22) Filed: Jun. 2, 2010

(65) Prior Publication Data
US 2011/0302094 A1   Dec. 8, 2011

(51) Int. Cl.
| | | |
|---|---|---|
| *G06Q 10/10* | (2012.01) | |
| *G06Q 30/02* | (2012.01) | |
| *G06Q 30/06* | (2012.01) | |
| *G06Q 10/04* | (2012.01) | |
| *G06Q 10/06* | (2012.01) | |
| *G06Q 30/00* | (2012.01) | |

(52) U.S. Cl.
CPC .......... *G06Q 30/06* (2013.01); *G06Q 30/018* (2013.01); *G06Q 30/0185* (2013.01)

(58) Field of Classification Search
CPC .................................................. G06Q 30/018
USPC ............................ 705/317, 1.1–912; 235/375
See application file for complete search history.

(56) References Cited

U.S. PATENT DOCUMENTS

| 7,162,035 B1 | 1/2007 | Durst et al. |
| 7,387,249 B2 | 6/2008 | Hudson et al. |
| 2003/0141358 A1* | 7/2003 | Hudson et al. ............... 235/375 |

(Continued)

FOREIGN PATENT DOCUMENTS

| WO | 2008012225 A1 | 1/2008 |
| WO | 2008056105 A1 | 5/2008 |

OTHER PUBLICATIONS

Lehtonen-et al.; "Trust and security in RFID-based product identification systems"; INSPEC/IEEE; vol. 1, No. 2 pp. 129-144; Dec. 2007.

(Continued)

*Primary Examiner* — Jonathan Ouellette
(74) *Attorney, Agent, or Firm* — Garg Law Firm, PLLC; Rakesh Garg; Richard Wilhelm

(57) ABSTRACT

A method, system, and computer usable program product for improved manufacturing and distribution to avoid counterfeit products in a supply chain are provided in the illustrative embodiments. For manufacturing to avoid a counterfeit product, a product to be manufactured is selected. Production volume information is determined, the production volume information including a number of units of the product to be produced. An identifier of a manufacturer of the product, an identifier of the product, and the production volume information are sent and several sets of identifiers are received. Each set of identifiers include identifiers corresponding to a customer reference number (CRN), a customer acknowledgment number (CAN), and a merchant acknowledgment number (MAN). One set of identifiers is uniquely associated with one unit of the product being produced. A unit of the product is manufactured such that the unit includes a corresponding set of identifiers.

15 Claims, 3 Drawing Sheets

(56) References Cited

U.S. PATENT DOCUMENTS

2005/0150964 A1 7/2005 Lo
2011/0276502 A1* 11/2011 Dameri .................. 705/317

OTHER PUBLICATIONS

Adnan-Ariffin, S.; "Secure Supply Lines"; Dialog/Inspec; Mar. 2009.
Vitharanan, P.; "Risks and Challenges of Component-Based Software Development"; ACM Digital Library: vol. 26, No. 8; Aug. 2003.
Oyomno-et al. "Privacy Implications of Context-Aware Services"; ACM Digital Library; Jun. 2009.

* cited by examiner

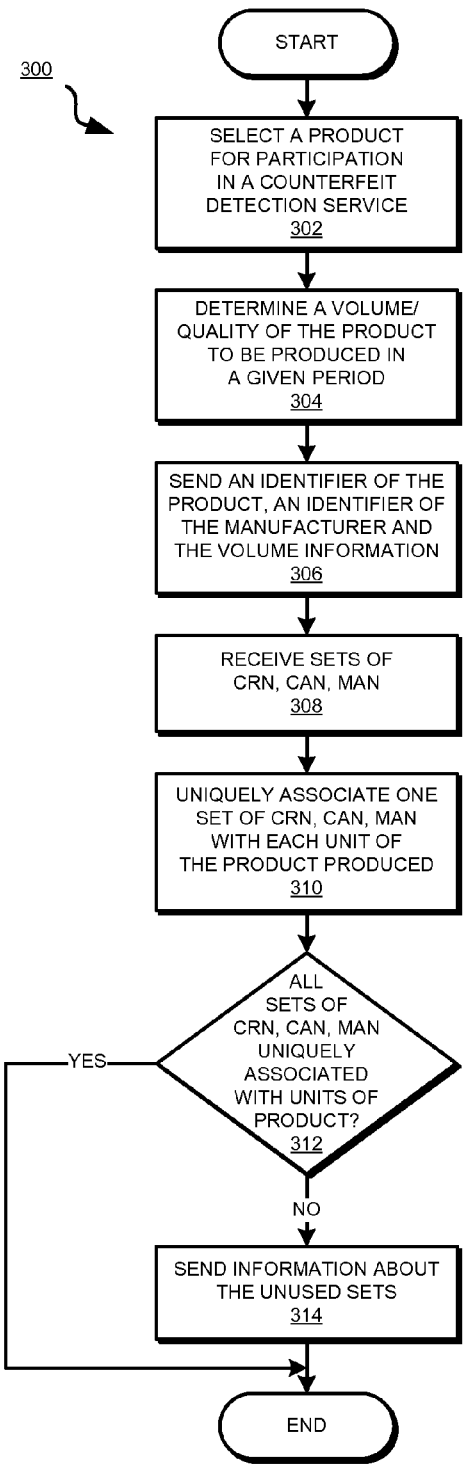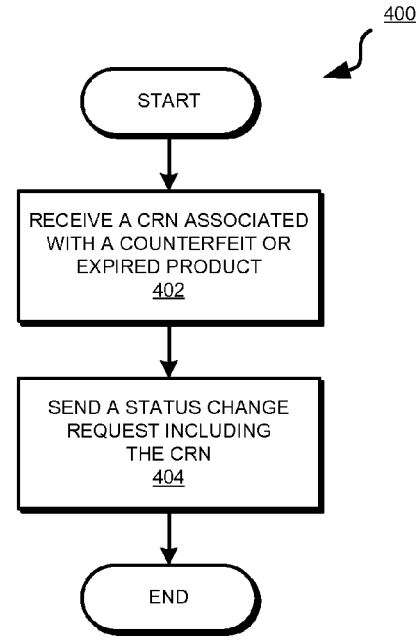

MANUFACTURING AND DISTRIBUTION TO AVOID COUNTERFEIT PRODUCTS

RELATED APPLICATION

The present invention is related to similar subject matter of co-pending and commonly assigned U.S. patent application Ser. No. 12/791,933 entitled "MITIGATING DISTRIBUTION AND CONSUMPTION OF COUNTERFEIT PRODUCTS," filed on Jun. 2, 2010, and U.S. patent application Ser. No. 12/791,943 entitled "PRE AND POST PURCHASE IDENTIFICATION OF COUNTERFEIT PRODUCTS," filed on Jun. 2, 2010, which are hereby incorporated by reference.

BACKGROUND OF THE INVENTION

1. Field of the Invention

The present invention relates generally to an improved data processing system, and in particular, to a computer implemented method for managing information about products in a supply chain. Still more particularly, the present invention relates to a computer implemented method, system, and computer usable program code for improved manufacturing and distribution to avoid counterfeit products.

2. Description of the Related Art

Today, distribution and selling of counterfeit products has become a significant problem in the global marketplace. Almost every country, every region, every industry suffers some loss due to the presence of counterfeit products along with the original products.

An original product is a product distributed, sold, or consumed according to the instructions of the rightful manufacturer of the product. A counterfeit product is a product that is not an original product. For example, a product that is a copy or a replica of an original product, intended for distribution, sale, or consumption as the original product, without the authorization of the manufacturer of the original product, is a counterfeit product. As another example, an original product that is distributed, sold, or consumed outside a date range or time period suggested by the manufacturer of the original product may also be considered a counterfeit product.

Some anti-counterfeit solutions currently exist in the market. However, none of these solutions provide a robust enough method to reduce or eliminate the distribution and selling of counterfeit products. The adverse effects of counterfeit products are diverse and far-reaching. For example, the pharmaceutical industry is one of the most widely affected industries when it comes to counterfeit products. Both the developed and the developing countries are suffering from counterfeit drugs that harm the health of the people, infringe upon the rights of the pharmaceutical companies, and violate the laws of sovereign nations and states.

As another example, nearly forty percent of consumer package goods (CPG) sold around the world are regarded as counterfeit for one reason or another. As another example, the Automobile Manufacturers Association indicates that counterfeit auto parts are a twelve billion dollar problem globally, causing a loss of approximately three billion dollars in the United States alone.

The list of counterfeit products is ever growing. Some of the product types that are most susceptible to counterfeiting include pharmaceuticals, CPG, Apparels, automotive parts, electronics and electrical equipment, beverages and tobacco products, toys, baby food, construction materials, agricultural products, and food products.

The effects of counterfeiting can be direct or indirect. For example, health problems, harm to equipment, loss of goodwill, and loss of revenue are some of the direct problems associated with counterfeiting. Local and global economic crisis, child labor, and violation of human rights are some of the indirect consequences of counterfeiting.

SUMMARY OF THE INVENTION

The illustrative embodiments provide a method, system, and computer usable program product for improved manufacturing and distribution to avoid counterfeit products. An embodiment for manufacturing to avoid a counterfeit product selects a product to be manufactured in a first application executing in a first data processing system. The embodiment determines production volume information, the production volume information including a number of units of the product to be produced. The embodiment sends an identifier of a manufacturer of the product, an identifier of the product, and the production volume information. The embodiment receives several sets of identifiers, each set of identifiers including identifiers corresponding to a customer reference number (CRN), a customer acknowledgment number (CAN), and a merchant acknowledgment number (MAN). The embodiment uniquely associates one set of identifiers from the several sets of identifiers with one unit of the product being produced. The embodiment manufactures a unit of the product. The unit includes a corresponding set of identifiers.

Another embodiment for product-distribution to avoid a counterfeit product receives a product to be purchased, the product having a set of identifiers associated with the product, the set of identifiers including a customer reference number (CRN), a customer acknowledgment number (CAN), and a merchant acknowledgment number (MAN). The embodiment sends, from a first application executing in a first data processing system, the CRN identifier associated with the product and receives a second MAN identifier responsive to sending the CRN. The embodiment compares the MAN associated with the product with the second MAN. If the comparison is negative, the embodiment aborts a sale of the product.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 3 depicts a flowchart of an example process of improved manufacturing and supply of products in a supply chain to mitigate the distribution or consumption of counterfeit products in accordance with an illustrative embodiment;

FIG. 4 depicts a flowchart of a process of avoiding a counterfeit product's presence in a supply chain in accordance with an illustrative embodiment.

DETAILED DESCRIPTION OF THE PREFERRED EMBODIMENT

The invention recognizes that the introduction of counterfeit products can occur at any of the several points in a given supply chain. For example, shops, distributors, retail outlets, suppliers, brokers, export/import points, warehouses, or transportation between points can each potentially be a point where a counterfeit product may be introduced. Accordingly, the invention recognizes that tracking the movement of products from a producer to a consumer is not always easy, practicable, or even sufficient for reducing or eliminating counterfeits.

For example, the invention recognizes that a common supply chain may include hundreds if not thousands of manufacturers. Each manufacturer may produce several brands or types of products. Each brand or type of product may include thousands of product items. Each distributor, broker, or distribution point may receive products for several supply chains from several suppliers. Each supplier may stock several products of several brands or types from several manufacturers. A retailer may source from several suppliers and/or distribution points.

Thus, the invention recognizes that between the producer and the consumer of a specific product, the transactions become complex and intermingled with many other factors affecting the supply chain. Accordingly, simply tracking a product is insufficient for preventing the introduction, distribution, and consumption of counterfeit products in a supply chain.

The invention recognizes that in many cases, a producer cannot answer affirmatively and with confidence whether the product that is sold is the original product the producer manufactured. Similarly, in many cases, a consumer cannot answer affirmatively and with confidence whether the product that was purchased is the original product that was manufactured.

Preventing counterfeits from entering the market is not always possible for the producers due at least to the size of the global supply chain in general. Detecting a counterfeit is not always possible for a consumer due to the striking similarities between the counterfeit and the original products and many other reasons.

The illustrative embodiments used to describe the invention generally address and solve the above-described problems and other problems related to counterfeit products in a supply chain. The illustrative embodiments provide a method, computer usable program product, and data processing system for improved manufacturing and distribution to avoid counterfeit products.

Figure 1:
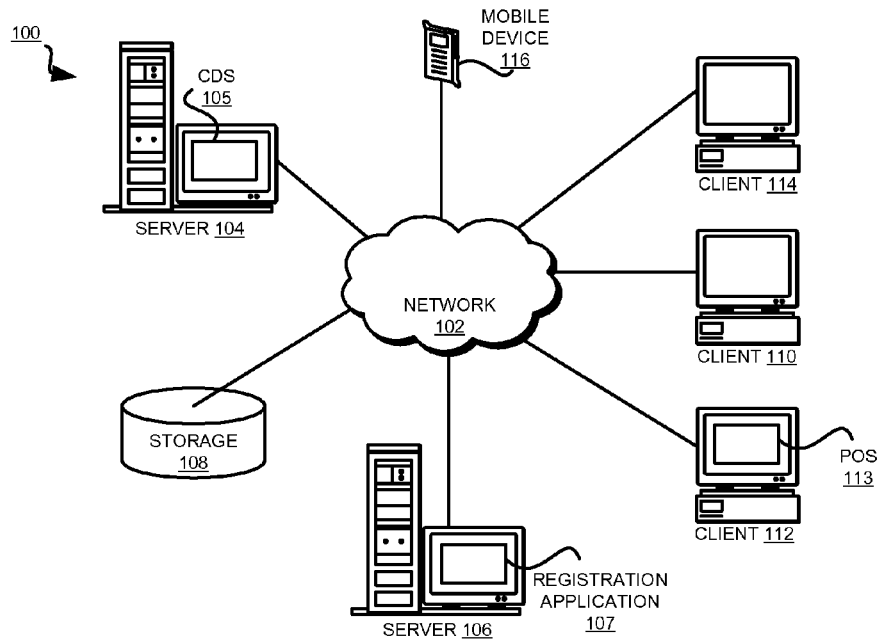
FIG. 1 depicts a pictorial representation of a network of data processing systems in which the illustrative embodiments may be implemented.
Figure 2:
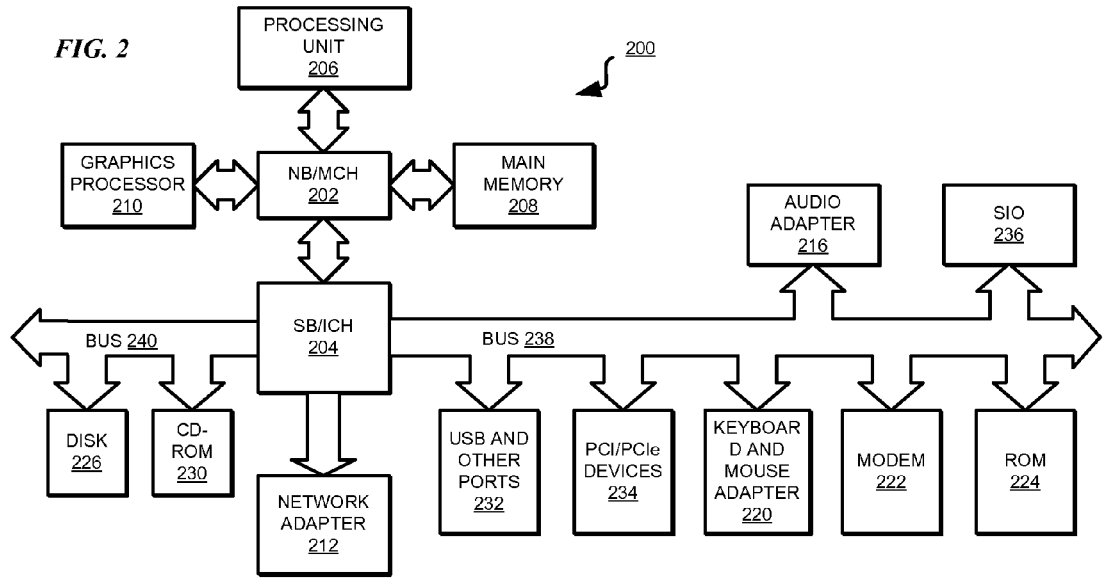
FIG. 2 depicts a block diagram of a data processing system in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 may include CDS 105. Server 106 may include registration application 107 usable by a manufacturer in accordance with an illustrative embodiment. POS 113 may be a point of sale application usable by a merchant in accordance with an illustrative embodiment. Mobile device 116 may be any mobile device, such as a cellular phone, usable by a consumer in accordance with an illustrative embodiment.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

With reference to FIG. 3, this figure depicts a flowchart of an example process of improved manufacturing and supply of products in a supply chain to mitigate the distribution or consumption of counterfeit products in accordance with an illustrative embodiment. Process 300 may be implemented in a registration application, such as registration application 107 in FIG. 1.

Process 300 begins by selecting a product for participation in a counterfeit detection service (CDS) (step 302). Process 300 determines a volume or quantity of the product, e.g., a number of units of manufacture of the product, that is to be produced in a given period (step 304). Process 300 sends an identifier of the product, an identifier of the manufacturer, and the volume information to the CDS (step 306).

Process 300 receives one or more sets of CRN, CAN, and MAN sets from the CDS (step 308). For example, for one hundred units of manufacture expected to be produced according to step 306, process 300 may receive one hundred sets of CRN, CAN, and MAN in step 308.

Process 300 uniquely associates one set of CRN, CAN, and MAN with each unit of the product that is produced (step 310). Process 300 determines whether all the sets of CRN, CAN, and MAN received in step 308 have been uniquely associated with separate units of the product (step 312).

If all the sets have been associated ("Yes" path of step 312), process 300 ends thereafter. If some sets remain unassociated ("No" path of step 312), process 300 sends the information about the remaining sets to the CDS (step 314). Process 300 ends thereafter. For example, in one embodiment, process 300 may simply use the sets in some predetermined sequence. In such an embodiment, process 300 may simply indentify how many sets were used or how many sets remain unused. The CDS using this information may sequentially count off the used sets from the sets that the CDS sent and cancel or void the remaining sets.

In another example embodiment, process 300 may send only the CRNs of the used sets or the remaining sets. The CDS may void the remaining sets using this information. In another example, embodiment, process 300 may send the complete CRN, CAN, and MAN sets that are remaining in step 314. Remaining sets of CRN, CAN, and MAN may be identified to the CDS in step 314 by any suitable method within the scope of the illustrative embodiment.

With reference to FIG. 4, this figure depicts a flowchart of a process of avoiding a counterfeit product's presence in a supply chain in accordance with an illustrative embodiment. Process 400, as an example, may be implemented in a registration application, such as registration application 107 in FIG. 1.

Process 400 begins by receiving a CRN associated with a counterfeit or expired product (step 402). For example, process 400 may receive the CRN of step 402 from a retailer, such as from POS 113 in FIG. 1. As another example, process 400 may receive the CRN from a consumer, such as from mobile device 116 in FIG. 1.

Process 400 sends a status change request for the CRN (step 404). Process 400 may end thereafter or perform further actions, such as notifying the sender of the CRN of the status update or alerting appropriate authorities of the presence of the counterfeit product at a location.

The status change request may request that the status of the unit of product associated with the CRN in the request be changed to identify the unit as a counterfeit, expired, or otherwise un-saleable. The status change request of step 404 may further include other information, such as a location of the product associated with the CRN, if such information is available. For example, the sender of the CRN may also send such information.

Figure 5:
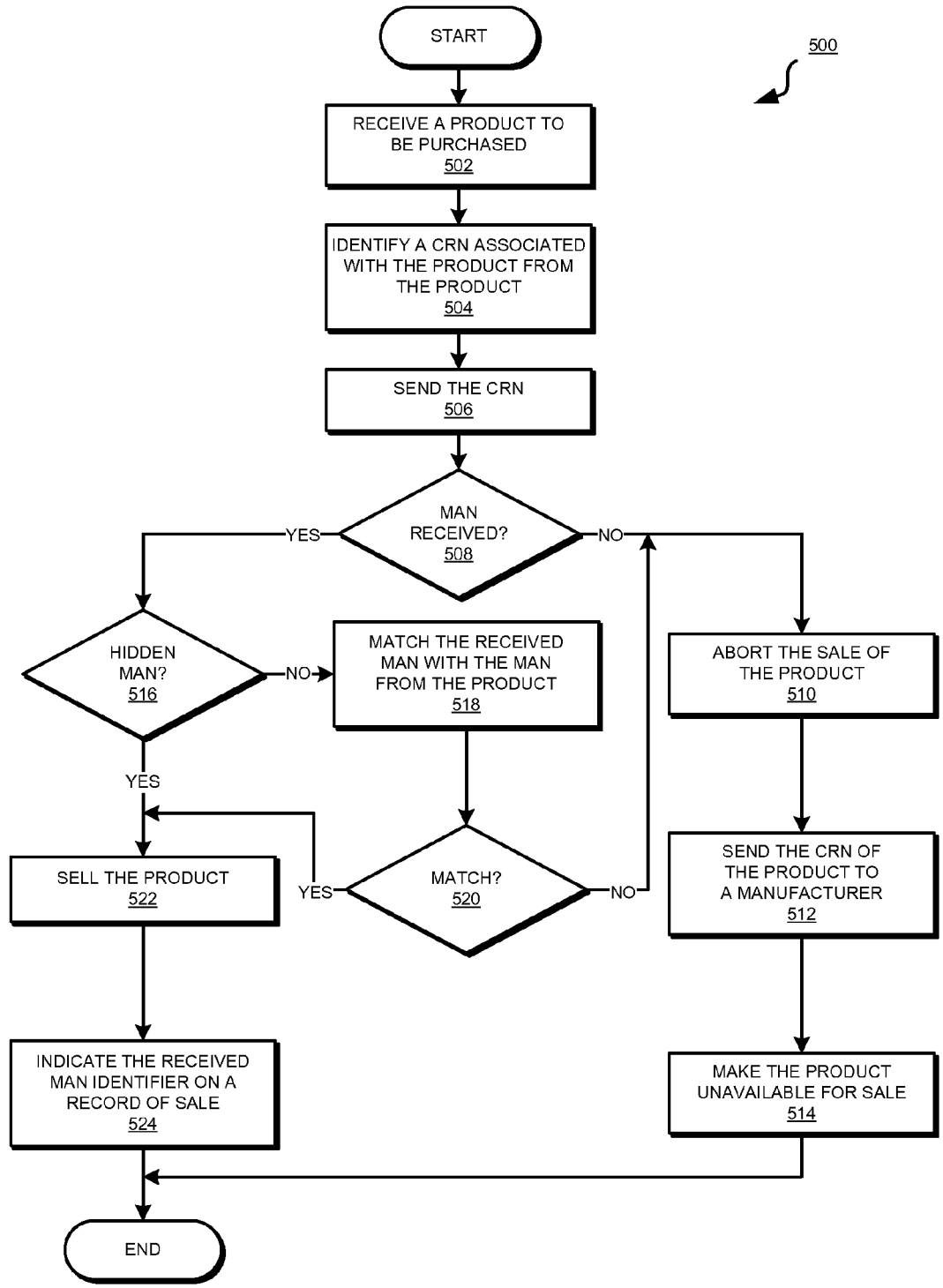
FIG. 5 depicts a flowchart of an example process of distributing products such that counterfeit products are avoided in accordance with an illustrative embodiment.

With reference to FIG. 5, this figure depicts a flowchart of an example process of distributing products such that counterfeit products are avoided in accordance with an illustrative embodiment. Process 500 may be implemented at a retailer system, such as POS 113 in FIG. 1.

Process 500 begins by receiving a product to be purchased (step 502). In one embodiment, information about a unit of a product to be purchased may be received in place of, or in addition to the product itself.

Process 500 identifies a CRN associated with the product, from the product (step 504). The CRN of step 504 should preferably be identified from the unit of the product that is to be purchased. In one embodiment, the CRN may be acquired from a database or repository if sufficient safeguards are available to ensure that the CRN can be traced to an actual unit of an actual product that a consumer can purchase from the retailer.

Process 500 sends the CRN (step 506). Process 500 may send the CRN to a CDS, such as CDS 105 in FIG. 1.

Process 500 determines whether a valid MAN is received in response to sending the CRN (step 508). If a MAN is not received, or the received MAN is not valid ("No" path of step 508), process 500 aborts the sale of the product (step 510). Process 500 may also, optionally, send the CRN of the product to a manufacturer (step 512). For example, step 512 may send the CRN to process 400 in FIG. 4.

Process 500 may make the product unavailable for sale (step 514). Process 500 may end thereafter. For example, the retailer may take the product off the shelf, an inventory may be updated to exclude the product unit, the product unit may be destroyed, or the custody of the product unit may be transferred, such as to appropriate authorities.

Returning to step 508, if the received MAN is valid ("Yes" path of step 508), process 500 determines whether the MAN is hidden on the product (step 516). For example, on certain products, the MAN information may be hidden under a label, or occluded from plain view by other methods. As an example, such methods of hiding the MAN information may be used so that only a consumer may make that information visible upon purchase. In other embodiments, the MAN identifier may be hidden in other ways as well so as to obscure or prevent the detection of the MAN identifier. For example, the identifier may be hidden in such a way that radio receivers associated with RFID sensors may not read that identifier.

If the MAN information on the product unit is not hidden ("No" path of step 516), process 500 matches the received MAN with the MAN on the product (step 518). Process 500 determines whether the two MANs match (step 520). If the two MAN do not match ("No" path of step 520), process 500 proceeds to step 510.

If the two MAN match ("Yes" path of step 520), process 500 proceeds to sell the product (step 522). If the MAN information is hidden on the product unit ("Yes" path of step 516), process 500 proceeds to step 522 as well.

Process 500 indicates the received MAN identifier on a record of sale, such as an invoice for the product being purchased (step 524). Process 500 ends thereafter.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for improved manufacturing and distribution to avoid counterfeit products. Using an embodiment of the invention, a manufacturer can take steps to thwart the introduction of counterfeit products in a supply chain. A manufacturer, a distributor, or a retailer can use an embodiment to avoid the distribution of counterfeit products.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for manufacturing to avoid a counterfeit product, the computer implemented method comprising:
   selecting, using a processor and a memory, in a first application executing in a first data processing system, a product to be manufactured;
   determining a production volume information, the production volume information including a number of units of the product to be produced;
   sending an identifier of a manufacturer of the product, an identifier of the product, and the production volume information;
   receiving a plurality of sets of identifiers, each set of identifiers including identifiers corresponding to a customer reference number (CRN), a customer acknowledgment number (CAN), and a merchant acknowledgment number (MAN), wherein the CRN uniquely identifies the product, the CAN is used by a customer for determining authenticity of the product, and the MAN is used by a merchant for determining authenticity of the product;
   uniquely associating one set of identifiers from the plurality of sets of identifiers with one unit of the product being produced; and
   manufacturing a unit of the product, the unit including a corresponding set of identifiers, wherein to establish the authenticity of the unit of the product, when the customer sends the CRN to a counterfeit detection service, the customer receives the CAN from the counterfeit detection service, and when the merchant sends the CRN to the counterfeit detection service, the merchant receives the MAN from the counterfeit detection service.

2. The computer implemented method of claim 1, further comprising:
   producing a number of units less than the production volume information; and
   sending information about unassociated sets of identifiers from the plurality of sets of identifiers.

3. The computer implemented method of claim 1, further comprising:
   receiving a fake CRN, the fake CRN being associated with a counterfeit product; and
   sending to a product registration application a status change request for the fake CRN requesting to change the status of a unit of the product corresponding to the fake CRN to indicate a counterfeit product.

4. The computer implemented method of claim 1, wherein an original MAN identifier associated with a unit is included in the unit such that the detection of the original MAN identifier is prevented prior to a sale of the unit.

5. A computer implemented method for product-distribution to avoid a counterfeit product, the computer implemented method comprising:
   configuring a network with at least three independent systems, a first system being configured as a trusted counterfeit detection service (CDS) such that another system acting as a CDS will be ignored by a second system and a third system, the second system operating as a point of sale (POS) system and configured to confirm an authenticity of a product in a data communication with the first system; and the third system operating as a user device and configured to confirm the authenticity of the product in a separate data communication with the first system;
   receiving the product to be purchased, the product having a set of identifiers associated with the product, the set of identifiers including a customer reference number (CRN), a customer acknowledgment number (CAN), and a merchant acknowledgment number (MAN), wherein the CRN uniquely identifies the product, the CAN is used by a user for determining the authenticity of the product, and the MAN is used by the merchant for determining the authenticity of the product, wherein to establish the authenticity of the product, when the third system sends the CRN to the CDS of the first system, the third system receives the CAN from the CDS of the first system, and when the second system sends the CRN to the CDS of the first system, the second system receives the MAN from the CDS of the first system;
   sending, using a processor and a memory, from the second system to the CDS of the first system, the CRN identifier associated with the product;
   receiving a second MAN identifier responsive to sending the CRN;
   comparing the MAN associated with the product with the second MAN; and
   aborting, responsive to the comparing being negative, a sale of the product.

6. The computer implemented method of claim 5, further comprising:
sending, responsive to the comparing being negative, the CRN to a second application; and
making the product unavailable for the sale.

7. The computer implemented method of claim 5, further comprising:
determining whether detection of the MAN associated with the product is prevented prior to the sale, wherein the comparing is omitted responsive to the detection the MAN being prevented;
completing the sale responsive to the detection the MAN being prevented; and
providing the second MAN on a record of the sale.

8. The computer implemented method of claim 5, responsive to the comparing being affirmative, further comprising:
completing the sale; and
providing the second MAN on a record of the sale.

9. The computer implemented method of claim 5, wherein receiving the product to be purchased is receiving information about the product to be purchased.

10. A computer usable program product comprising a non-transitory computer usable storage medium including computer usable code for manufacturing to avoid a counterfeit product, the computer usable code when executed by a processor causes a method to be performed, the method comprising:
configuring a network with at least three independent systems, a first system being configured as a trusted counterfeit detection service (CDS) such that another system acting as a CDS will be ignored by a second system and a third system, the second system operating as a point of sale (POS) system and configured to confirm an authenticity of a product in a data communication with the first system; and the third system operating as a user device and configured to confirm the authenticity of the product in a separate data communication with the first system;
selecting a product to be manufactured;
determining a production volume information, the production volume information including a number of units of the product to be produced;
sending an identifier of a manufacturer of the product, an identifier of the product, and the production volume information;
receiving a plurality of sets of identifiers, each set of identifiers including identifiers corresponding to a customer reference number (CRN), a customer acknowledgment number (CAN), and a merchant acknowledgment number (MAN), wherein the CRN uniquely identifies the product, the CAN is used by a user for determining the authenticity of the product, and the MAN is used by the merchant for determining the authenticity of the product;
uniquely associating one set of identifiers from the plurality of sets of identifiers with one unit of the product being produced; and
manufacturing a unit of the product, the unit including a corresponding set of identifiers, wherein to establish the authenticity of the unit of the product, when the third system sends the CRN to the CDS of the first system, the third system receives the CAN from the CDS of the first system, and when the second system sends the CRN to the CDS of the first system, the second system receives the MAN from the CDS of the first system.

11. The computer usable program product of claim 10, the method further comprising:
producing a number of units less than the production volume information; and
computer usable code for sending information about unassociated sets of identifiers from the plurality of sets of identifiers.

12. The computer usable program product of claim 10, the method further comprising:
receiving a fake CRN, the fake CRN being associated with a counterfeit product; and
sending to a product registration application a status change request for the fake CRN requesting to change the status of a unit of the product corresponding to the fake CRN to indicate a counterfeit product.

13. The computer usable program product of claim 10, wherein an original MAN identifier associated with a unit is included in the unit such that the detection of the original MAN identifier is prevented prior to a sale of the unit.

14. The computer usable program product of claim 10, wherein the computer usable code is stored in a non-transitory computer readable storage medium in a data processing system, and wherein the computer usable code is transferred over a network from a remote data processing system.

15. The computer usable program product of claim 10, wherein the computer usable code is stored in a non-transitory computer readable storage medium in a server data processing system, and wherein the computer usable code is downloaded over a network to a remote data processing system for use in a non-transitory computer readable storage medium associated with the remote data processing system.

* * * * *